July 29, 1958 F. C. WILLIAMS 2,845,611

DIGITAL STORAGE SYSTEMS

Filed Nov. 8, 1954 3 Sheets-Sheet 1

INVENTOR:
FREDERIC C. WILLIAMS

By Stevens, Davis, Miller & Mosher
Attorneys

July 29, 1958 F. C. WILLIAMS 2,845,611

DIGITAL STORAGE SYSTEMS

Filed Nov. 8, 1954 3 Sheets-Sheet 2

INVENTOR:
FREDERIC C. WILLIAMS

By Stevens, Davis, Miller & Mosher

Attorneys

INVENTOR:
FREDERIC C. WILLIAMS

By
Stevens, Davis, Miller & Mosher
Attorneys

United States Patent Office 2,845,611
Patented July 29, 1958

2,845,611

DIGITAL STORAGE SYSTEMS

Frederic Calland Williams, Oakhurst, Romiley, England, assignor to National Research Development Corporation, London, England, a corporation of Great Britain Application November 8, 1954, Serial No. 467,583

Claims priority, application Great Britain November 10, 1953

16 Claims. (Cl. 340—174)

The present invention relates to systems of and apparatus for the storage of digital information, that is to say, information which can be represented by means of digit elements which may be of one kind (representing, for instance, the numeral "1") or of a different kind (representing, for instance, the numeral "0"). Such arrangements are widely used, for example, as information stores in computing apparatus employing the binary system of notation.

It is already known to construct information stores using digital storage elements each in the form of a magnetic core of material having a suitable degree of remanence and in which the polarisation of the remanent magnet induction in such core is used to indicate which of the two kinds of digit element is registered therein. An information store using such magnetic core devices may comprise a plurality of such devices arranged in a matrix of interlaced electrical connections, each core providing for the storage of one digit element of information. Access to any individual core for the purpose of writing information thereinto or for reading information thereout of may be obtained by arranging for that individual core to lie at the intersection of two appropriately energised co-ordinate elements of the circuit matrix which is interlaced through the cores. Writing of information into a core may be effected by applying to the said core a magnetising force appropriate to magnetise it, preferably to the saturation point, in the particular polarisation sense chosen to represent the required kind of digit element while reading of information stored in a core may be effected by applying to the said core a magnetising force in a given predetermined polarisation sense and detecting whether or not the core undergoes a reversal of its polarity of magnetisation. If there is no reversal then obviously the stored information was of the kind similar to that which would be produced by the applied magnetising force whereas if reversal does take place then the previously stored information was obviously of the other kind. Such arrangements have the disadvantage, however, that in the case where the aforesaid reading operation causes the magnetism to be reversed, the information previously held in the core will have been destroyed and it is necessary, in those circumstances where continued retention of the information in the core is required, to use the output to effect or to control the re-writing of the information back into the core. Such magnetic core type storage elements and information stores embodying them are described by An Wang and Way Dong Woo in "Journal of Applied Physics," January 1950, p. 49, by An Wang in "Proceedings of the Institute of Radio Engineers," June 1950, p. 626, and April 1951, p. 401, and by J. A. Rajchman in "Proc. I. R. E.," October 1953, p. 1407.

As described by J. R. Anderson in "Communications and Electronics," January 1953, p. 395, another form of storage element utilises materials, commonly known as ferroelectric materials, as a dielectric in a capacitive device in which the equivalent effects are obtained with respect to remanent electric induction instead of remanent magnetic induction and the present invention in many of its aspects is applicable also to such electrically polarisible devices as well as to the previously mentioned magnetically polarisible devices. As the storage effect in each case is dependent largely upon the hysteresis characteristic, either magnetic or dielectric, as the case may be, devices of such magnetic or ferroelectric type will hereinafter for convenience, be referred to collectively as "hysteresis type storage devices." Such hysteresis type storage devices as have hitherto been proposed require, for satisfactory operation, magnetic or dielectric materials in which the remanent induction value is as nearly as possible equal to the saturation induction value and that the hysteresis characteristic shall have as near a so-called square loop or rectangular form as can be obtained.

A principal object of the present invention is to provide a method of and means for reading out the stored information from such a hysteresis type storage device or from an information store embodying a plurality of such devices without effecting the destruction of the information record previously held in the storage element or store and accordingly, without the necessity of effecting any regeneration of the originally stored information when its continued retention is required. Another object of the invention is the provision of a digital storage device or an information store comprising a plurality of similar storage devices of such hysteresis type in which the usual requirements for as square or rectangular shape as possible of the hysteresis characteristic is relaxed with consequent increase in the number of magnetic or dielectric materials which can be usefully employed therein.

In accordance with the method of the present invention reading of the information stored in a hysteresis type storage device is effected by applying input oscillatory signals of at least two different frequencies to said device to produce fluctuations of the induction state therein which extend over a non-linear region of the hysteresis characteristic of the storage body of the device but which are cumulatively insufficient to effect alteration of the polarisation direction, deriving an output signal from said device comprising an inter-modulation beat frequency between said input signals and then determining the phase of such beat frequency signal with relation to a reference signal of the same beat frequency to provide identification of the information recording state existing in said device.

In the particular application of the invention to a storage device having a magnetic core, each of the oscillatory input signals is preferably applied to a separate inductive winding on the core while the output signal is derived from a further inductive winding on said core.

Apparatus in accordance with the invention comprises a hysteresis type storage device, for instance a magnetic body, adapted to be magnetised to a state of polarisation of one sense to define an element of information of one kind or a state of polarisation of the opposite sense to define an element of information of another kind, the two states of polarisation corresponding to two points on the magnetic hysteresis characteristic of the magnetic body lying in regions of non-linearity of such characteristic, the non-linearities of the two respective regions being oppositely sensed, means for applying to said device input oscillatory signals of at least two different frequencies to provide fluctuations of the induction state therein which extend over a non-linear region of the hysteresis characteristic of the storage body of the device but which are cumulatively insufficient to effect alteration of the polarisation direction, means for deriving an output signal including an intermodulation beat frequency between said applied input signals and means for determining the phase relationship between such output signal and a reference signal of the same beat frequency to provide identification of the state of polarisation existing in said storage body and hence the nature of the digital information represented thereby.

In order that the nature of the invention may be more readily understood reference will now be made in the following description to the accompanying drawings in which:

Fig. 4 is a diagrammatic representation, similar to Fig. 3, of a modification, while

Figure 1:
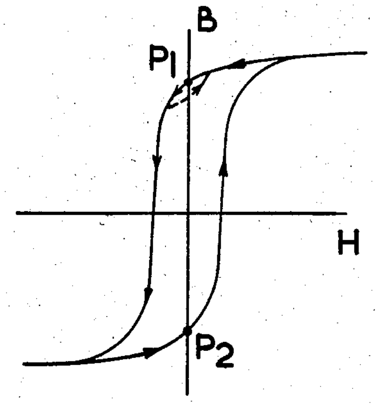
Fig. 1 is an explanatory diagram showing a typical hysteresis loop for a ferro-magnetic substance.

Referring first to Fig. 1 the hysteresis or B/H loop diagram illustrated therein may be regarded as a typical one for the type of magnetic core material which may be employed in arrangements embodying the present invention. It will readily be understood how, by means of suitable polarising currents, the material of such a magnetic core may be driven into a state of magnetisation represented by the point $P_1$ on the hysteresis curve or into a state represented by the point $P_2$ on the same curve whereby the elements of information of say "1" or "0" can be separately represented. Thus the state represented by point $P_1$ may indicate the binary value "1" and that represented by point $P_2$ the binary value "0."

It will be observed that the hysteresis diagram shows a degree of non-linearity or curvature over the region extending for a limited distance on either side of the aforesaid points $P_1$ and $P_2$. At $P_1$ the curvature is concave downwardly whereas at $P_2$ it is concave upwardly. For small variations of magnetising current (H) about zero the magnetic induction (B) does not follow the curve exactly during each of its opposite excursions but, instead, performs a small or so-called minor loop about the point $P_1$ or $P_2$ as the case may be. A typical minor loop about point $P_1$ is shown in dotted lines.

If now, by means of suitable windings provided on a core having the hysteresis characteristic of Fig. 1, there are applied to the core two oscillations of different frequencies there will be produced in an output winding associated with such core, a signal in which one of the input frequencies will intermodulate with the other so as to produce beat frequencies including the sum and difference frequencies of the two applied frequencies. This intermodulation is produced by virtue of the non-linear nature of the core hysteresis characteristic. The phase of such sum or difference beat frequencies has a pardetermined relationship to a standard and constant frequency signal identical with that of the aforesaid beat note frequency which is dependent upon the polarisation direction of the remanent magnetisation of the core.

Thus, if two similar cores are energized in the same way by frequencies *f*1 and *f*2 and if both cores are polarised to the point $P_1$ of the hysteresis curve of Fig. 1, then the respective difference beat frequency signals derived from the two cores will be in phase with one another whereas if one core is polarized to the point $P_1$ and the other to the point $P_2$ on the hysteresis curve, the respective difference beat frequency signals from the two cores will be in phase opposition to one another in view of the fact that the beat frequency variations are imposed on remanent magnetic fluxes whose respective polarisation directions are opposite to one another. Such phase relationship can therefore be employed as a means of providing an indication of whether a given magnetic core is magnetised to the condition corresponding to the point $P_1$ of the hysteresis curve or magnetised to the condition corresponding to the point $P_2$. Such phase comparison may be effected by utilising as a standard or reference phase signal one which is derived from a similar core maintained polarised in a chosen standard manner. Alternatively the reference phase signal can be derived in any other suitable way provided the necessary synchronism with the beat note frequency can be maintained. Although only the difference frequency has been discussed above it is obvious that other intermodulation signals show similar effects and can be employed in like manner.

Figure 2:
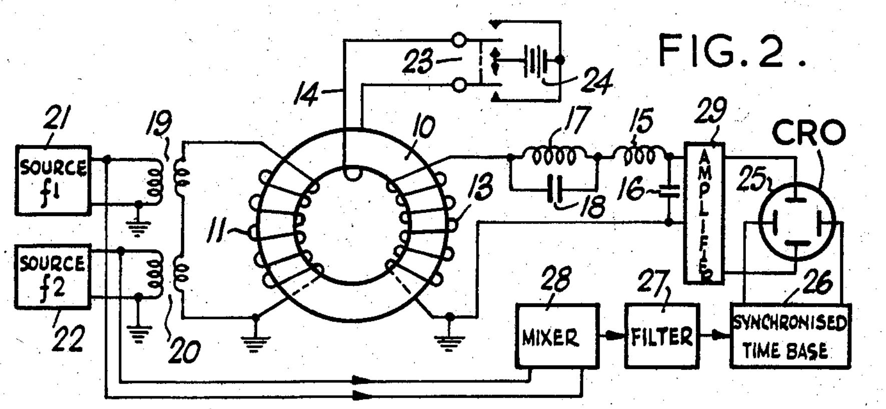
Fig. 2 is a diagrammatic representation of a simplified and experimental apparatus arrangement in accordance with the present invention.

Referring now to Fig. 2, this shows diagrammatically one simplified and mainly experimental apparatus arrangement for operation in accordance with the invention. In this arrangement an annular magnetic core 10 is provided with an input winding 11, an output winding 13 and a single turn polarising winding 14. The input winding 11, which may be of about 10 turns, is connected in series with the secondary windings of two transformers 19, 20 whose primary windings are connected respectively to the output terminals of two valve oscillators 21, 22 constituting the sources of input oscillatory signals *f*1 and *f*2. The oscillators 21, 22 and transformers 19, 20 may be of any known suitable form while frequencies *f*1 and *f*2 are preferably of relatively high frequency value, say, 5 mc./s. for frequency *f*1 and 5 mc./s.–25 kc./s. for frequency *f*2. The output winding 13, which may be of about 15 turns, is connected by way of a rejector circuit consisting of inductance 17 and capacitance 18, and an acceptor circuit consisting of inductance 15 and capacitance 16, to the input terminals of an amplifier 29 whose output is supplied to the Y deflection plates of a cathode ray oscillograph tube 25. The X deflection plates of the tube 25 are supplied by a suitable time base circuit 26 having a synchronising input which is supplied by way of a filter circuit with the output from a mixer circuit 28 whose alternative frequency input terminals are supplied respectively from the oscillator sources 21, 22 of the frequencies *f*1 and *f*2. The acceptor circuit, comprising inductance 15 and capacitance 16, is resonant at a frequency of 25 kc./s., i. e. the difference beat frequency between the two input signals *f*1 and *f*2 while the rejector circuit, comprising parallel inductance 17 and capacitance 18, is resonant at about 5 mc./s. or more preferably over the band 5 mc./s. to 5 mc./s.–25 kc./s. in order to eliminate the input frequencies *f*1 and *f*2 from the subsequent phase determining circuits. The amplifier 29 is of any convenient known form, preferably one having a narrow pass band centred on 25 kc./s. while the cathode ray oscilloscope 25 has its associated X-time base circuit 26 arranged for operation at the difference beat note frequency, i. e. 25 kc./s. Both the oscilloscope 25 and the time base circuits 26 can be of any suitable known form. The mixer circuit 28 can be of any suitable known form as also can the filter circuit 27 which is arranged to have a narrow pass band centred on 25 kc./s.

The polarising winding 14 is connected by way of a two-pole polarity-reverser switch 23 to a D. C. source which is indicated, for simplicity, as a battery 24.

If switch 23 is operated so that a pulse of current is passed through the polarising winding 14 in a direction which serves to drive the core 10 to a state of magnetisation beyond the point $P_1$ of the hysteresis curve of Fig. 1, the magnetisation or induction state of the core will return to and will remain stable at the value $P_1$ after cessation of the polarising current. With sources 21 and 22 in operation, an output signal at 25 kc./s., due to mixing of the two input signals *f*1, *f*2, is now available in winding 13. After filtering in filters 17, 18 and 15, 16 and amplification in amplifier 29, this will be displayed on the screen of the cathode ray tube 25. If now switch 23 is operated so that a further polarising current is passed through winding 14 in a sense reverse to that previously applied thereby to reverse the magnetisation state of the core 10 to the condition represented by point $P_2$ on the hysteresis curve of Fig. 1, then a further 25 kc./s. output signal will be obtained and displayed on the cathode ray tube screen but this will be seen to be in anti-phase relationship to the 25 kc./s. signal previously obtained.

To provide a satisfactory information store it is usually necessary to provide a large number of digit storage elements and to be able to "read" the information selectively from any given element, preferably without affecting its state and thereby losing the information or being called upon to regenerate it; it is also necessary to be able to "write" into any given element, the subsequent recording state of which represents a given digit element of information.

Such requirements can be met with the aid of the present invention in a number of different ways. For example, a plurality of magnetic cores each having appropriate row, column and output windings may be arranged in known manner with such windings suitably interconnected in a matrix of interlaced connections. If the 5 mc./s. signal *f1* of the simple arrangement of Fig. 2 is applied to all the cores in one selected co-ordinate of the matrix, and the 5 mc./s.–25 kc./s. signal *f2* is applied to all the cores in one selected transverse co-ordinate of the matrix then only that core which lies at the intersection of the two co-ordinates will have both of these frequencies applied to it. Only in this core, therefore, will the 25 kc./s. beat note frequency be produced so that if the output windings provided on all the cores are connected to a single phase-sensitive detector, it will be known that any output from such phase-sensitive detector will be due solely to the core at the aforesaid intersection. By feeding a suitable reference oscillation to such phase-sensitive detector, for instance, the 25 kc./s. signal used to generate the 5 mc./s.–25 kc./s. input signal applied to the matrix, the phase of the output from the selected core can be identified directly as being that representing a "1" digit element or that representing a "0" digit element according to the nature of the output obtained from the phase-sensitive detector. It follows that, by switching the two "reading" frequencies *f1* and *f2* successively to different co-ordinates in their respective dimensions according to any desired or normal scanning regime, all the cores of the matrix can be examined in any desired order and the information stored on each of them read out in the form of an output from the phase-sensitive detector.

In order to "write" information into such a store, it is necessary to drive the magnetisation of a selected core into one state or the other, corresponding to the points $P_1$ or $P_2$ of Fig. 1. Assuming that an arrangement equivalent to that used in the experiment of Fig. 2 is employed, this requires a minimum value of magnetising current of, for instance, about 0.5 amp. in the single turn polarisation winding on the selected core. The necessary magnetising force can, however, be provided by two currents of half the value, for instance, 0.25 amp. each passing through a separate turn on the core so that the same total of 0.5 amp. turn is achieved. A single current pulse of 0.25 amp. will not affect the magnetisation state of any core so that if the two 0.25 amp. polarising signals are applied to the respective and selected co-ordinates of the matrix of cores as already described in connection with reading, it will be seen that the requisite 0.5 amp. turn will be applied only to that core which lies at the intersection of the two selected co-ordinates.

All the other cores of the matrix will be subjected to a polarising pulse of only 0.25 amp. turn and their state of magnetisation will not be adversely affected but in order to ensure that the stored information shall not be impaired by "writing" operations effected on other cores, it may be preferred to employ "writing" current pulses arranged in pairs of mutually reversed polarity so that the cores experience a "positive" polarising force followed by a "negative" polarising force or a "negative" force followed by a "positive" force, according to whether the digit element value "0" or "1" is to be written into the store. All the cores which are to be unaffected by the "writing" and which receive only one 0.25 amp. pulse pair will thus be subjected to a symmetrical disturbance by which they will be restored to their initial state of magnetisation. In that single core which receives the two pairs of pulses (total value—0.5 amp. turn), however, the core will be left in the state of magnetisation represented by the second pulse of the pair and the order of occurrence of the two senses of pulse will therefore be chosen accordingly.

Figure 3:
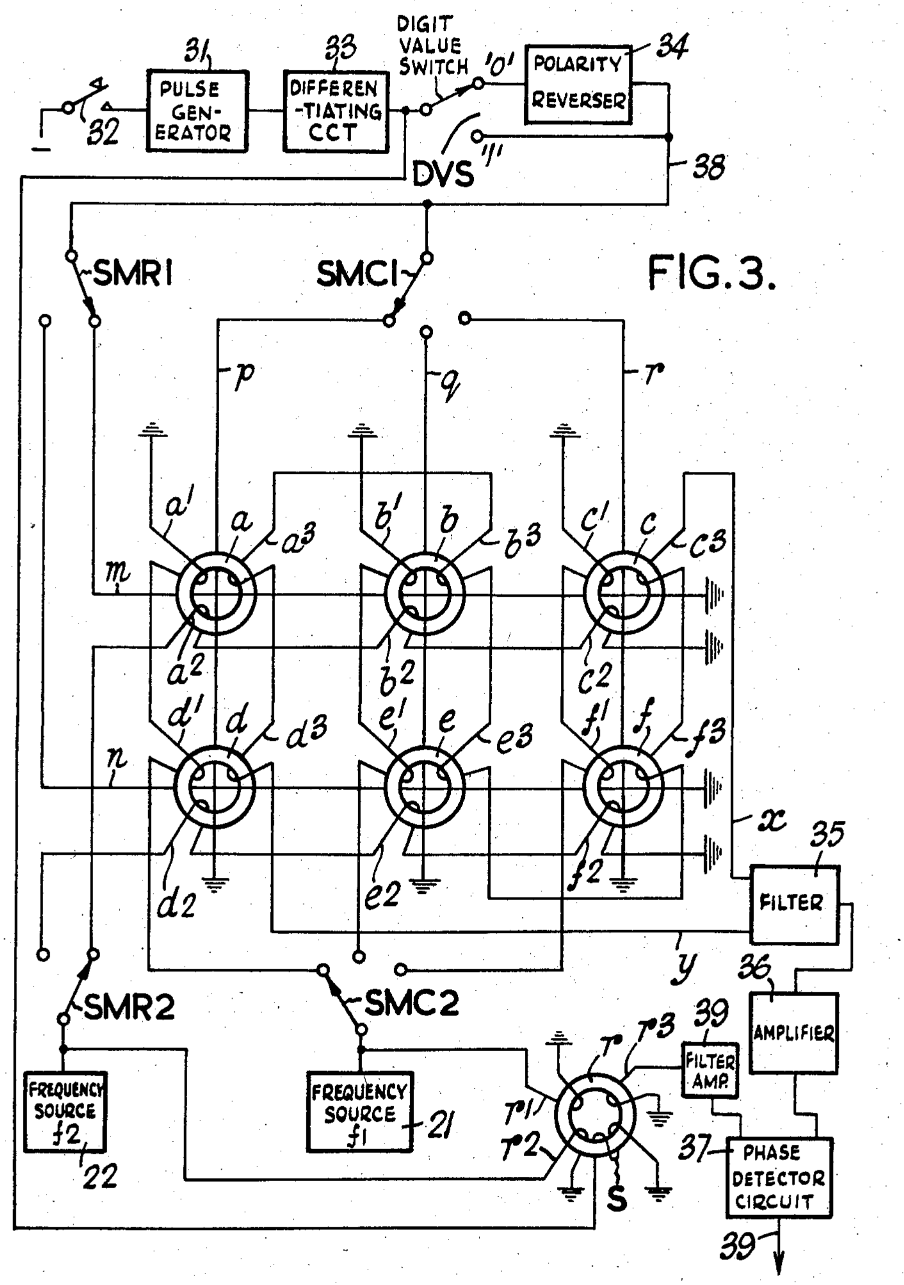
Fig. 3 is a diagrammatic representation of a fragment of an information store embodying the present invention.

An example of one form of information store according to the invention is illustrated in Fig. 3 which diagrammatically illustrates a fragment of a magnetic core matrix. In this figure *a, b, c, d, e,* and *f* are annular cores of suitable magnetic material such, for example, as those offered for sale under the trade name "Ferranic." Each core is shown provided with three windings $a_1$, $a_2$, $a_3$, $b_1$, $b_2$, $b_3$ . . . $f_1$, $f_2$, $f_3$ which are illustrated as single-turn windings, for the sake of clarity, but may of course have any suitable number of turns. The windings $a_1$ and $d_1$, $b_1$ and $e_1$, $c_1$ and $f_1$ are connected in series in vertical columns and the windings $a_2$, $b_2$, $c_2$ and $d_2$, $e_2$, $f_2$ are connected in series in horizontal rows whereas the windings $a_3$, $b_3$, $c_3$, $d_3$, $e_3$, $f_3$ are all connected in series to the output lines *x, y*. Also threading the cores are column wires *p, q, r,* threading the three vertical columns respectively and row wires *m, n* threading the two horizontal rows respectively. It will be seen that these wires are threaded so as to couple additively with the cores in which they intersect.

A square pulse generator 31, controlled by suitable means such as key switch 32 provides a single square pulse output at each operation cycle thereof to a differentiating circuit 33 the output from which is fed to a digit value control switch DVS having two positions "0" and "1." The "1" value position of this switch provides the differentiated square pulse output from circuit 33 directly to busbar 38 but the opposite "0" value position of the switch causes the interposition of a polarity reversing circuit 34 between the circuit 33 and the busbar 38. The busbar 38 is connected to selector switch means SMR1 controlling the supply of current to row wires *m* and *n* and is also connected to selector switch means SMC1 controlling the supply of current to column wires *p, q, r*.

The pulse generator 31 can be of any convenient type, for example, a mono-stable multivibrator circuit as described in M. I. T. Radiation Laboratory Series, vol. 19 (1949)—McGraw-Hill, pp. 166–171, and particularly Figs. 5–10. The differentiating circuit 33 is of the normal R/C type while the polarity reversing circuit 34 may be of the usual form employing a thermionic valve as described, for example, in M. I. T. Radiation Laboratory Series, vol. 18 (1948), McGraw-Hill, p. 105, Figs. 2–35(*b*). The switching means SMR1 and SMC1, although shown for simplicity as simple multipoint hand switches, can be of any suitable electric or electronic controlled form.

Upon operation of key switch 32 after appropriate setting of the digit value switch DVS, a single negative-going pulse is generated and, after differentiation in circuit 33, provides a writing pulse pair comprising a negative pulse followed by a positive pulse at the switch DVS. According to the setting of this switch, so either such pulse pair or the reversed polarity version thereof, i. e. positive pulse followed by negative pulse, is available on busbar 38.

If the selector switch means SMR1 and SMC1 have been operated to select, for example the two wires $p$ and $m$, the applied pulses, operating in the manner already described above, will have an additive effect only in core $a$ and it can, again as above described, be arranged that only in this core will the state of magnetisation be driven into the polarity dictated by the sense of the current pulses, the other cores of the matrix being unaffected. By suitably energising the appropriate combinations of wires $p$, $q$, $r$ and $m$, $n$, by means of the selector switch means SMR1 and SMC1 obviously any given core can be magnetised in the appropriate polarity chosen to represent an element of information (e. g. a "0" or a "1") to be stored in the respective core.

The two groups of windings $a_2$, $b_2$, $c_2$ and $d_2$, $e_2$, $f_2$ are connected to selector switch means SMR2 which may conveniently be similar to and arranged for conjoint operation with the switch means SMR1. Similarly the three groups of windings $a_1$ and $d_1$, $b_1$ and $e_1$, $c_1$ and $f_1$ are connected to selector switch means SMC2 which may also be similar to and arranged for conjoint operation with switch means SMC1. Switch means SMR2 is connected to frequency source 22 providing frequency $f2$ (e. g. 5 mc./s.–25 kc./s.) while switch means SMC2 is connected to frequency source 21 providing frequency $f1$ (e. g. 5 mc./s.). Such frequency sources may each be normal stable frequency valve oscillators of conventional form.

The series group of windings $a_3$ . . . $f_3$ are connected through a filter network 35, which is arranged to pass only the 25 kc./s. beat note component, to an amplifier 36 whose output supplies one input to a phase-detector circuit 37. The other input to such phase detector circuit 37 is derived, through a filter-amplifier circuit 39, from the winding $r_3$ of a further or reference core $r$ whose windings $r_1$ and $r_2$ are connected respectively to the frequency sources 21 and 22. This core $r$ is arranged to be held polarised in a chosen one, e. g. that representing digit value "0" by connection of its further (two turn) energising winding $s$ to the output from differentiating circuit 33.

The filter network 35, amplifier 36 and filter-amplifier circuit 39 can be of any convenient and well known form while the phase-detector circuit 37 may be of the kind described by E. A. Johnson in British Patent No. 592,835 or in M. I. T. Radiation Laboratory Series, vol. 21 (1948), McGraw-Hill, p. 384, Figs. 12–14.

Assuming, for example, that switch means SMR2 and SMC2 are set as shown, then frequency $f1$ from source 21 is applied to the series-connected windings $a_1$, $d_1$, and frequency $f2$ is applied to the series-connected windings $a_2$, $b_2$ and both frequencies $f1$ and $f2$ will be present only in core $a$ of the matrix. Only in that core will the beat frequency $f1$—$f2$ be generated and the output supplied through filter 35 and amplifier 36 to the phase detector circuit 37, will be due to core $a$ and will provide on the output lead 39 from the phase detector circuit, a signal whose polarity is indicative of the state of magnetisation of core $a$. The standard or reference core $r$ provides a continuous reference phase to the phase detector circuit 37 by operation in the manner already described.

It will thus be seen how, by suitably switching the polarising currents through selected wires $p$, $q$, $r$, and $m$, $n$, any desired combination of digit elements can be "written" into the store and by suitably switching the frequencies $f1$ and $f2$ between the respective columns and rows of windings the stored digit elements can be read out in a given sequence.

Obviously the invention is capable of a wide variety of forms of realisation. For example, the arrangement which has just been described with reference to Fig. 3 is suitable for use in a computer operating in the serial mode and in which the information is required to be read out digit by digit in a given time sequence. Alternatively a stock of arrays such as that shown in fragmentary form in Fig. 3 could be built up, each with its own phase detector 37 and associated filter and amplifier means, but with common frequency sources 21, 22 and common selector switch means SMR2, SMC2 for supplying frequencies $f1$ and $f2$ to corresponding co-ordinates of each array. All the digits in corresponding position in the various arrays could then be read out in parallel.

Figure 4:
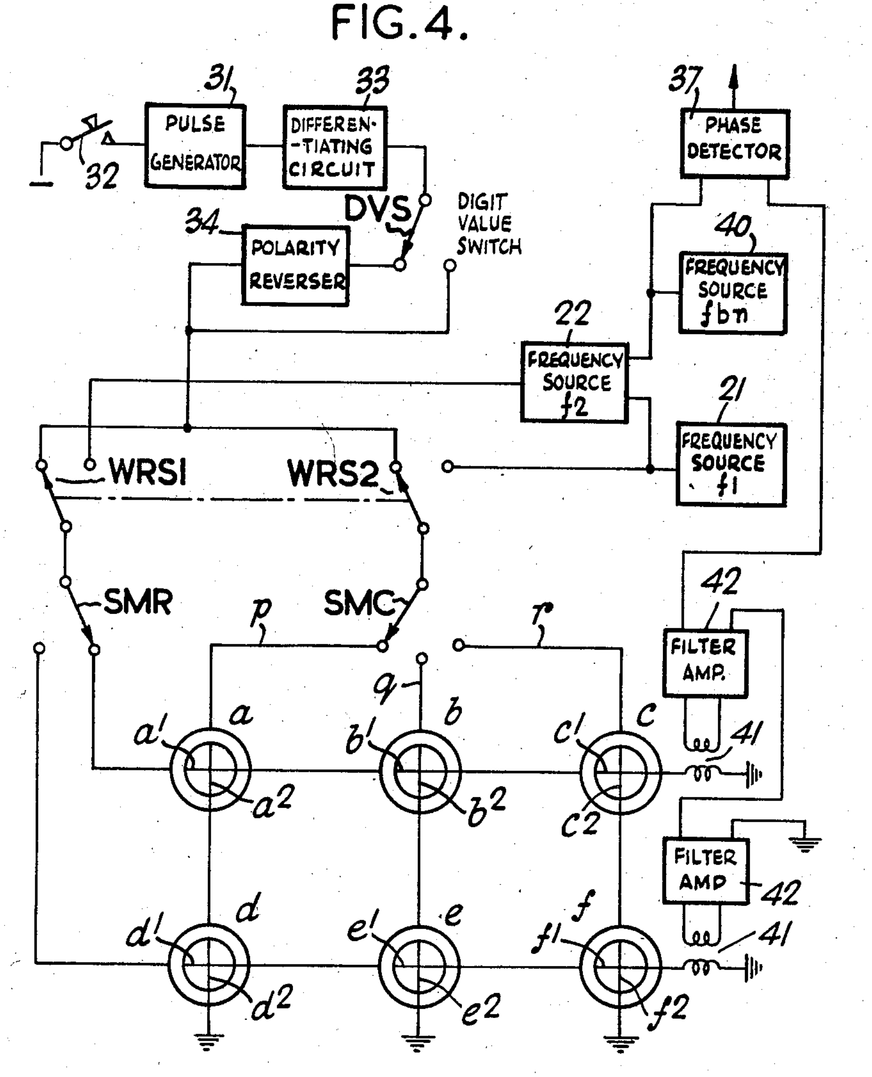

Although for the sake of clarity separate windings have been shown in Fig. 3 for effecting "writing" and for supplying the frequencies $f1$ and $f2$ it is apparent from the diagram that the same windings can be used for both purposes by external switching means. One arrangement of this form is shown in Fig. 4 where a single row selector switch means SMR controls the selection of the required row wire constituting windings $a_1$ . . . $f_1$ and a single selector column selector switch means SMC controls the selection of the required column wire constituting the windings $a_2$ . . . $f_2$. A separate write/read switch means consisting of coupled switches WRS1, WRS2 serves to connect the selected row and column wires either to the write-in apparatus or to the reading-out apparatus.

Furthermore since the output signal will be present in any circuit linking all the cores, and is of a frequency different from any of the applied frequencies, an output signal can be obtained by coupling the frequency selecting and phase detector means to either or both the co-ordinate and/or the transverse co-ordinate wires in an array, thus eliminating the need for a separate "read" winding. Fig. 4 also shows one arrangement for this purpose wherein transformers 41 in each row wire feed to the phase detector circuit 37 through filter/amplifiers 42. This figure also shows an alternative manner of providing the reference phase by use of a further oscillator 40 operating at the beat note frequency $fbn$ (e. g. 25 kc./s.). This frequency is used to modulate the frequency $f1$ in a modulator circuit to generate the requisite second frequency $f2$ ($f1$—$fbn$) in source 22.

Again writing may be carried out by using one of the alternating current signals, say that of frequency $f1$, connected to one co-ordinate of the matrix as for reading but with the other alternating current signal, i. e. that of frequency $f2$ (which for reading would be connected to the other and transverse co-ordinate) replaced by a unidirectional pulse of an amplitude such that, at those instants when the unidirectional pulse and the A. C. signal $f1$ are additive in the selected core, the total drive is sufficient to change the state of magnetisation of the core, whereas neither the A. C. signal nor the unidirectional pulse acting alone, is capable of changing the state.

Alternatively the reading oscillatory signals $f1$ and $f2$ may be left superposed on the normal writing pulses applied to the selected co-ordinate and transverse co-ordinate, instead of eliminating the read signals during the writing process. It will be appreciated of course that the "read" signals alone must be of sufficiently small amplitude as to be unable to cause a complete change of state in the core, on the other hand they must be large enough to make a significant excursion over the non-linear part of the characteristic to cause measurable intermodulation. Experiment indicates that there is an adequate working range between these limits. In view of the fact that discrimination between the two core states is no longer dependent upon presence or absence of an output pulse upon attempted change of state during reading the usual ideal of a square or rectangular shaping of the hysteresis characteristic is no longer so desirable and a wider range of permissible materials becomes available.

This invention has been described in terms of individual magnetic cores for each digit, but it will be appreciated by those skilled in the art that it can be applied to other configurations of storage bodies employing drilled or grooved plates of magnetic material to replace a number of individual cores.

Figure 5:
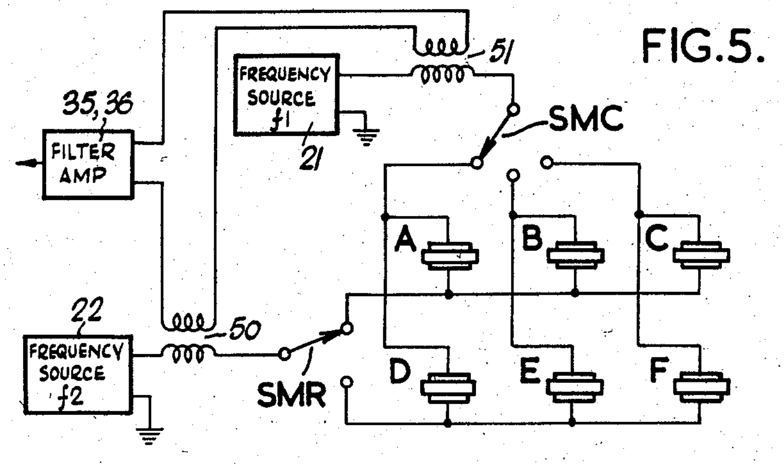
Fig. 5 is a further diagrammatic representation of another embodiment of the invention utilising dielectric type storage devices.

Although this invention has been described in terms of polarisible magnetic elements it is well known that there are materials which are electrically polarisible in an analogous manner. These materials are commonly known as ferroelectric materials, and several storage devices using these materials have been proposed. It will be immediately apparent that this invention, suitably rearranged, has application in this field also. Fig. 5 shows one arrangement of this type in which A, B, C, D, E and F indicate such ferroelectric elements fed through selector switch means SMR and SMC from oscillatory signal sources 21, 22. The beat note output signal is, in this example, derived through transformers 50, 51 coupled to the row and column wires carrying the input signals.

A matrix of cores according to the invention may extend in two dimensions or three dimensions, the interlaced circuitry being suitably arranged. In such a three dimensional arrangement it is possible to use a third input signal frequency and then to select an output from any single core in the three-dimensional matrix by reference to the modulation complex obtained by combination of all three of the input frequencies which would be present in only the one core to which all three input coordinate wires simultaneously applied. In similar manner, it will be clear that the principle of the invention can be extended to greater numbers of dimensions and greater numbers of signal frequencies.

I claim:

1. Apparatus for storage of digital information which comprises a hysteresis type storage device of the kind wherein information is stored by the retentivity of the device when the energisation necessary to effect input of such information is removed, means for applying to said device input oscillatory signals of at least two different frequencies to produce fluctuations of the induction state therein which extend over a non-linear region of the hysteresis characteristic of the storage body of the device but which are cumulatively insufficient to effect alteration of the polarisation direction, means for deriving an output signal from said device consisting of an intermodulation beat frequency between said input signals and means for determining the phase relationship between such output signal and a reference signal of the same beat frequency.

2. Apparatus according to claim 1 wherein said hysteresis type storage device comprises a magnetic element adapted to be magnetised to a state of polarisation of one sense to define an element of information of one kind or a state of polarisation of the opposite sense to define an element of information of another kind, the two states of polarisation corresponding to two points on the hysteresis characteristic of the magnetic element in regions of non-linearity of said characteristic, the non-linearities at the two regions being of opposite sense, and at least one circuit element inductively associated with said magnetic element for applying said input signals and deriving said output signal.

3. Apparatus according to claim 2 wherein said magnetic element has at least three separate windings inductively associated therewith, a first and a second of said windings serving respectively for the application of said two input signals and the third of said windings serving for the derivation of said output signal.

4. Apparatus in accordance with claim 1 which comprises a plurality of said hysteresis type storage devices arranged in a matrix of interlaced connections defining rows and columns, any one storage device being disposed in only one row and in only one column.

5. Apparatus in accordance with claim 4 which includes switching means for selectively applying one of said input oscillatory signals to a chosen row in said matrix and for selectively applying another of said input oscillatory signals to a chosen column in said matrix so as to effect selection of a desired single storage device for selective reading of its stored information.

6. Apparatus in accordance with claim 5 in which said input oscillatory signals are of relatively high radio frequency of the order of 1 mc./s. or above.

7. Apparatus in accordance with claim 6 which includes means for deriving said reference signal comprising a further similar hysteresis type storage device arranged to be supplied with each of said input oscillatory signals and to be maintained continuously in a predetermined state of polarisation.

8. Apparatus according to claim 7 which includes means for writing into any chosen one of said storage devices, said writing in means including an arrangement for generating pairs of pulses of mutually opposite polarity and in either of two reversed senses for defining the alternative kinds of digital element to be recorded.

9. Apparatus for the storage of digital information which comprises a hysteresis type storage device including a retentive magnetic element adapted to be magnetised to a state of remanent magnetisation having a polarisation of one sense to define an element of information of one kind or to a state of remanent magnetisation having a polarisation of the opposite sense to define an element of information of another kind, the two states of remanent magnetisation corresponding to two points on the hysteresis characteristic of the magnetic element in regions of non-linearity of such characteristic, the non-linearity of the two regions being of opposite sense, means for applying to said device input oscillatory signals of at least two different frequencies to produce fluctuations of the remanent magnetic flux therein which extend over one or other of said non-linear regions of the hysteresis characteristic but which are cumulatively insufficient to effect alteration of the polarisation direction, means for deriving an output signal from said device consisting of an intermodulation beat frequency between said input signals and means for determining the phase relationship between such output signal and a reference signal of the same beat frequency.

10. Apparatus for the storage of digital information which comprises a hysteresis type storage device including a retentive magnetic element adapted to be magnetised to a state of remanent magnetisation having a polarisation of one sense to define an element of information of one kind or to a state of remanent magnetisation having a polarisation of the opposite sense to define an element of information of another kind, the two states of remanent magnetisation corresponding to two points on the hysteresis characteristic of the magnetic element in regions of non-linearity of such characteristic, the non-linearity of the two regions being of opposite sense, means including at least one circuit element inductively coupled to said magnetic element for applying to said device input oscillatory signals of at least two different frequencies to produce fluctuations of the remanent magnetic flux therein which extend over one or other of said non-linear regions of the hysteresis characteristic but which are cumulatively insufficient to effect alteration of the polarisation direction, means including a further circuit element inductively coupled to said magnetic element for deriving an output signal from said device consisting of an intermodulation beat frequency between said input signals and means for determining the phase relationship between such output signal and a reference signal of the same beat frequency.

11. Apparatus for the storage of digital information which comprises a hysteresis type storage device including a retentive magnetic element adapted to be magnetised to a state of remanent magnetisation having a polarisation of one sense to define an element of information of one kind or to a state of remanent magnetisation having a polarisation of the opposite sense to define an element of information of another kind, the two states of remanent magnetisation corresponding to two points on the hysteresis characteristic of the magnetic element in regions of non-linearity of such characteristic, the non-linearity of the two regions being of opposite sense, means including separate first and second windings inductively coupled to said element for applying to said device input oscillatory signals of two different frequencies to produce fluctuations of the remanent magnetisation flux therein which extend over one or other of said non-linear regions of the hysteresis characteristic but which are cumulatively insufficient to effect alteration of the polarisation direction, means including a separate third winding inductively coupled to said element for deriving an output signal from said device consisting of an inter-modulation beat frequency between said input signals and means for determining the phase relationship between such output signal and a reference signal of the same beat frequency.

12. Apparatus for the storage of digital information which comprises a plurality of said hysteresis type storage devices according to claim 11, said devices being arranged as a matrix of rows and columns, said first windings of each of the devices in each row being connected in series to a separate row wire and said second windings of each of the devices in each column being connected in series to a separate column wire.

13. Apparatus according to claim 12 which includes switching means for selectively applying one of said input oscillatory signals to a chosen row wire in said matrix and for selectively applying another of said input oscillatory signals to a chosen column wire in said matrix so as to effect selection of a desired single storage device for selective reading of its stored information.

14. Apparatus according to claim 13 in which said third windings of each of said storage devices are connected in series to an output wire and which includes a source of reference signals at said beat frequency and phase detector means connected to said source of reference signals and said output wire.

15. Apparatus in accordance with claim 14 in which said source of reference signals comprising a further similar hysteresis type storage device having its first and second windings connected to be supplied respectively with said input oscillatory signals and its third winding connected to supply said phase detector means, said storage device being arranged to be maintained continuously in a predetermined state of polarisation.

16. Apparatus in accordance with claim 15 in which each of said input oscillatory signals is of radio frequency of the order of 1 mc./s. or above.

References Cited in the file of this patent

UNITED STATES PATENTS 2,614,167 Kamm ---------------- Oct. 14, 1952